(12) United States Patent
Nakagawa et al.

(10) Patent No.: US 9,973,035 B2
(45) Date of Patent: May 15, 2018

(54) POWER MANAGEMENT DEVICE FOR VEHICLE

(71) Applicant: TOYOTA JIDOSHA KABUSHIKI KAISHA, Toyota-shi, Aichi-ken (JP)

(72) Inventors: Nobuyuki Nakagawa, Miyoshi (JP); Yoshifumi Ohmori, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 86 days.

(21) Appl. No.: 15/119,865

(22) PCT Filed: Jan. 19, 2015

(86) PCT No.: PCT/JP2015/051228
§ 371 (c)(1),
(2) Date: Aug. 18, 2016

(87) PCT Pub. No.: WO2015/129329
PCT Pub. Date: Sep. 3, 2015

(65) Prior Publication Data
US 2017/0093211 A1 Mar. 30, 2017

(30) Foreign Application Priority Data
Feb. 28, 2014 (JP) .................. 2014-039727

(51) Int. Cl.
*H02J 13/00* (2006.01)
*B60L 11/18* (2006.01)
*B60K 6/44* (2007.10)

(52) U.S. Cl.
CPC ........... *H02J 13/00* (2013.01); *B60L 11/1811* (2013.01); *B60L 11/1861* (2013.01); *B60K 6/44* (2013.01);
(Continued)

(58) Field of Classification Search
CPC ........ H02J 13/00; B60K 6/44; Y10S 903/904; B60L 11/1861; B60L 2210/10; B60Y 2200/91; B60Y 2200/92
See application file for complete search history.

(56) References Cited

U.S. PATENT DOCUMENTS

2010/0017249 A1 1/2010 Fincham et al.
2011/0210698 A1 9/2011 Sakai
(Continued)

FOREIGN PATENT DOCUMENTS

EP 2 442 428 A1 4/2012
JP 2003-333706 11/2003
(Continued)

*Primary Examiner* — Robert Deberadinis
(74) *Attorney, Agent, or Firm* — Finnegan, Henderson, Farabow, Garrett & Dunner, LLP

(57) ABSTRACT

A power management device for vehicles includes a communication control section that performs interactive communication to selectively supply and receive the electric power with respect to the external power source device and a supplying/receiving control section that controls supplying/receiving of the electric power by the vehicle-mounted power storage device. When the condition that the supplying/receiving control section is in the great power state is satisfied, control of the supplying/receiving of the electric power is allowed. If the supplying/receiving control section is in the decreased state before the vehicle-mounted power storage device and the external power source device selectively supply and receive the electric power with respect to each other, the communication control section performs the interactive communication.

7 Claims, 5 Drawing Sheets

(52) U.S. Cl.
CPC ....... *B60L 2210/10* (2013.01); *B60L 2210/42* (2013.01); *B60Y 2200/91* (2013.01); *B60Y 2200/92* (2013.01); *Y10S 903/904* (2013.01)

(56) References Cited

U.S. PATENT DOCUMENTS

| | | |
|---|---|---|
| 2012/0112696 A1 | 5/2012 | Ikeda et al. |
| 2014/0042985 A1 | 2/2014 | Ishii et al. |
| 2014/0167691 A1 | 6/2014 | Kamaga |
| 2015/0042288 A1 | 2/2015 | Ishii et al. |
| 2015/0084587 A1 | 3/2015 | Kato et al. |

FOREIGN PATENT DOCUMENTS

| | | |
|---|---|---|
| JP | 2011-182518 | 9/2011 |
| JP | 2011-196826 A | 10/2011 |
| JP | 2012-020710 A | 2/2012 |
| JP | 2012-205314 | 10/2012 |
| JP | 2012-222873 A | 11/2012 |
| JP | 2013-099078 A | 5/2013 |
| JP | 2013-151222 | 8/2013 |
| JP | 2013-187968 | 9/2013 |
| JP | 2013-198375 | 9/2013 |
| JP | 2013-243791 A | 12/2013 |
| WO | WO 2011-007573 A1 | 12/2012 |
| WO | WO 2013/027291 A1 | 2/2013 |
| WO | WO 2012-153399 A1 | 7/2014 |

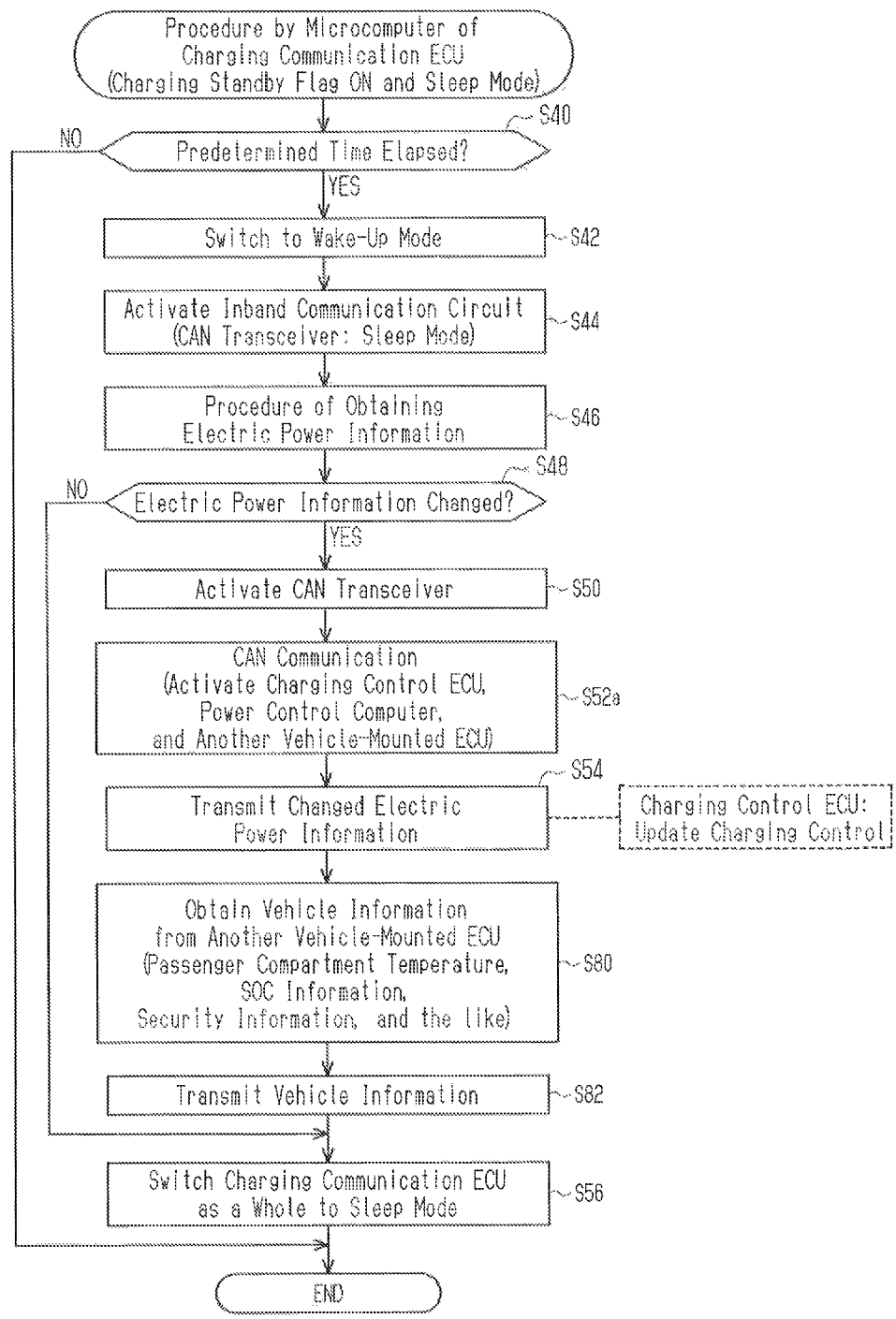

POWER MANAGEMENT DEVICE FOR VEHICLE

CROSS-REFERENCE TO RELATED APPLICATIONS

This application is a national phase application of International Application No. PCT/JP2015/051228, filed Jan. 19, 2015, and claims the priority of Japanese Application No. 2014-039727, filed Feb. 28, 2014, the content of both of which is incorporated herein by reference.

TECHNICAL FIELD

The present invention relates to a power management device for vehicles.

BACKGROUND ART

Patent Document 1 discloses a vehicle-mounted power storage device that selectively supplies and receives electric power with respect to an external power source device. When the external power source device is connected to a vehicle through a charging cable and the power source voltage of an auxiliary-device battery is equal to or smaller than a predetermined value, the vehicle-mounted power storage device prohibits electric power supply from the auxiliary-device battery to devices other than devices involved in updating of charging control programs.

According to a recent proposal, with a charging cable maintained in a state connected to a vehicle, charging may be held in a standby state until a later time zone in which the electric power is less expensive. However, the device disclosed in Patent Document 1 does not particularly set a restriction for when the power source voltage of the auxiliary-device battery is greater than the predetermined voltage. Therefore, by the time charging is performed with the charging cable maintained in the state connected to the vehicle, the electric power of the auxiliary-device battery is unnecessarily consumed by vehicle-mounted devices.

PRIOR ART DOCUMENT

Patent Document

Patent Document 1: Japanese Laid-open Patent Publication No. 2013-151222

SUMMARY OF THE INVENTION

Problems that the Invention is to Solve

Accordingly, it is an objective of the present invention to provide a power management device for vehicles capable of decreasing the amount of energy consumed by a vehicle by the time a vehicle-mounted power storage device selectively supplies and receives electric power with respect to an external power source device.

Means for Solving the Problem

To solve the above-described problem, according to a first aspect of the present invention, provided is a power management device for vehicles employed in a vehicle including a vehicle-mounted power storage device that selectively supplies and receives electric power with respect to an external power source device. The power management device for vehicles includes a communication control section that performs interactive communication to selectively supply and receive the electric power with respect to the external power source device and a supplying/receiving control section that controls supplying/receiving of the electric power by the vehicle-mounted power storage device. The supplying/receiving control section is switchable between a great power state and a decreased state in which the power consumption amount is smaller than in the great power state. If the condition that the supplying/receiving control section is in the great power state is satisfied, control of the supplying/receiving of the electric power is allowed. If the supplying/receiving control section is in the decreased state before the vehicle-mounted power storage device and the external power source device selectively supply and receive the electric power with respect to each other, the communication control section performs the interactive communication.

When the interactive communication is performed, the control of the supplying/receiving of the electric power by the supplying/receiving control section does not necessarily have to be carried out. Therefore, if the supplying/receiving control section is in the great power state when the interactive communication is performed, the power consumption amount of the vehicle is increased unnecessarily. However, in the above-described configuration, the interactive communication is performed when the supplying/receiving control section is in the decreased state. This decreases the amount of the energy consumed by the vehicle by the time the electric power is selectively supplied and received.

In the above-described power management device for vehicles, it is preferable that the communication control section be switchable between a great power state and a decreased state in which the power consumption amount is smaller than in the great power state, that the interactive communication be allowed by switching the communication control section to the great power state, and that, when the communication control section is in the decreased state and the supplying/receiving control section is in the decreased state, the communication control section be switched to the great power state to perform the interactive communication if a condition for starting the interactive communication is satisfied.

In the above-described device, the communication control section is selectively switched to the great power state to perform the interactive communication when the communication control section and the supplying/receiving control section are both in the decreased state. This decreases the power consumption amount of the supplying/receiving control section at the time of the interactive communication.

In the above-described power management device for vehicles, it is preferable that a schedule generating section for generating a schedule for selectively supplying and receiving the electric power based on information obtained through the interactive communication be provided, that the communication control section be switched to the decreased state if the condition that a standby time until the supplying/receiving of the electric power is started according to the schedule generated by the schedule generating section is not less than a predetermined time is satisfied, and that the supplying/receiving control section be switched to the decreased state if the condition that the standby time until the supplying/receiving of the electric power is started, according to the schedule generated by the schedule generating section is not less than a predetermined time is satisfied.

In the above-described power management device for vehicles, it is preferable that the communication control section be capable of communicating with the supplying/receiving control section, that the communication control section include a vehicle external communication circuit for performing the interactive communication, a vehicle internal communication circuit for communicating with the supplying/receiving control section, and an operating section for operating the vehicle external communication circuit and the vehicle internal communication circuit, that the vehicle external communication circuit and the vehicle internal communication circuit be both switchable between a great power state and a decreased, state in which the power consumption amount is smaller than in the great power state, that the decreased state of the communication control section be a state in which the vehicle external communication circuit and the vehicle internal communication circuit are both in the decreased state, that the great power state of the communication control section be a state in which at least the vehicle external communication circuit is in the great power state, and that, if the vehicle external communication circuit and the vehicle internal communication circuit are both in the decreased state and the condition for starting the interactive communication is satisfied, the operating section selectively switch the vehicle external communication circuit to the great power state to perform the interactive communication.

In the above-described device, when the communication control section is switched from the decreased state to the great power state to perform the interactive communication, the vehicle internal communication circuit is maintained in the decreased state. This reduces the power consumption amount of the vehicle.

In the above-described power management device for vehicles, it is preferable that a schedule generating section for generating a schedule for selectively supplying and receiving electric power based on information obtained by the communication control section through the interactive communication be provided and that, if the information obtained through communication with the external power source device indicates that electric power information at the side of the external power source device has been changed, the communication control section change the schedule by means of the schedule generating section.

In the above-described, device, the schedule is updated to an appropriate schedule based on the information obtained through the interactive communication.

In the above-described power management device for vehicles, it is preferable that the supplying/receiving control section and the schedule generating section have a common hardware such that the supplying/receiving control section configures the schedule generating section, that generation of the schedule by the schedule generating section be allowed by switching the supplying/receiving control section to the great power state, and that, if the information obtained through the communication with the external power source device indicates that the electric power information at the side of the external power source device has been changed, the communication control section command the supplying/receiving control section to switch to the great power state.

In the above-described device, when the schedule needs to be changed, the supplying/receiving control section is switched to the great power state. This allows the schedule generating section, which the supplying/receiving control section includes, to change the schedule.

In the above-described power management device for vehicles, it is preferable that the communication control section be capable of communicating with both the supplying/receiving control section and a predetermined control section that is a control section other than the supplying/receiving control section and mounted in the vehicle, that the predetermined control section be switchable between a great power state and a decreased state in which the power consumption amount is smaller than in the great power state, that the supplying/receiving control section monitor in the decreased state whether a command for switch to the great power state is output from the communication control section, and that, if the information obtained through the communication with the external power source device indicates that the electric power information at the side of the external power source device has been changed, the communication control section selectively command, through the communication, the supplying/receiving control section to switch to the great power state.

In the above-described device, if the information obtained through the communication with the external power-source device indicates that the electric power information at the side of the external power source device has been changed, the supplying/receiving control section is selectively commanded to switch to the great power state through the communication. This ensures avoidance of increase of the power consumption amount of the vehicle caused by unnecessary switch of the predetermined control section to the great power state.

In the above-described power management device for vehicles, it is preferable that the communication control section be capable of communicating with both the supplying/receiving control section and a predetermined control section that is a control section other than the supplying/receiving control section and mounted in the vehicle, that the predetermined control section be switchable between a great power state and a decreased state in which the power consumption amount is smaller than in the great power state and be allowed to transmit information to the communication control section by being switched to the great power state, and that, if the information obtained through the communication with the external power source device indicates that the electric power information at the side of the external power source device has been changed, the communication control section command, through the communication, the supplying/receiving control section and the predetermined control section to switch to the great power state, obtain the information possessed by the predetermined control section through activation of the predetermined control section, and inform a user of the obtained information through an informing section.

In the above-described device, if the information obtained through the communication with the external power source device indicates that the electric power information at the side of the external power source device has been changed, not only the supplying/receiving control section but also the predetermined control, section is switched to the great power state. In this manner, switch of the predetermined control section to the great power state allows the communication control section to cause the predetermined control section to execute a procedure of transmitting information. This allows the informing section to inform the user of the information.

BRIEF DESCRIPTION OF THE DRAWINGS

FIG. 5 is a flowchart representing procedure steps of a charging communication ECU according to a second embodiment of the invention.

MODES FOR CARRYING OUT THE INVENTION

First Embodiment

A first embodiment of a power management device for vehicles according to the present invention will now be described with reference to FIGS. 1 to 4.

Figure 1:
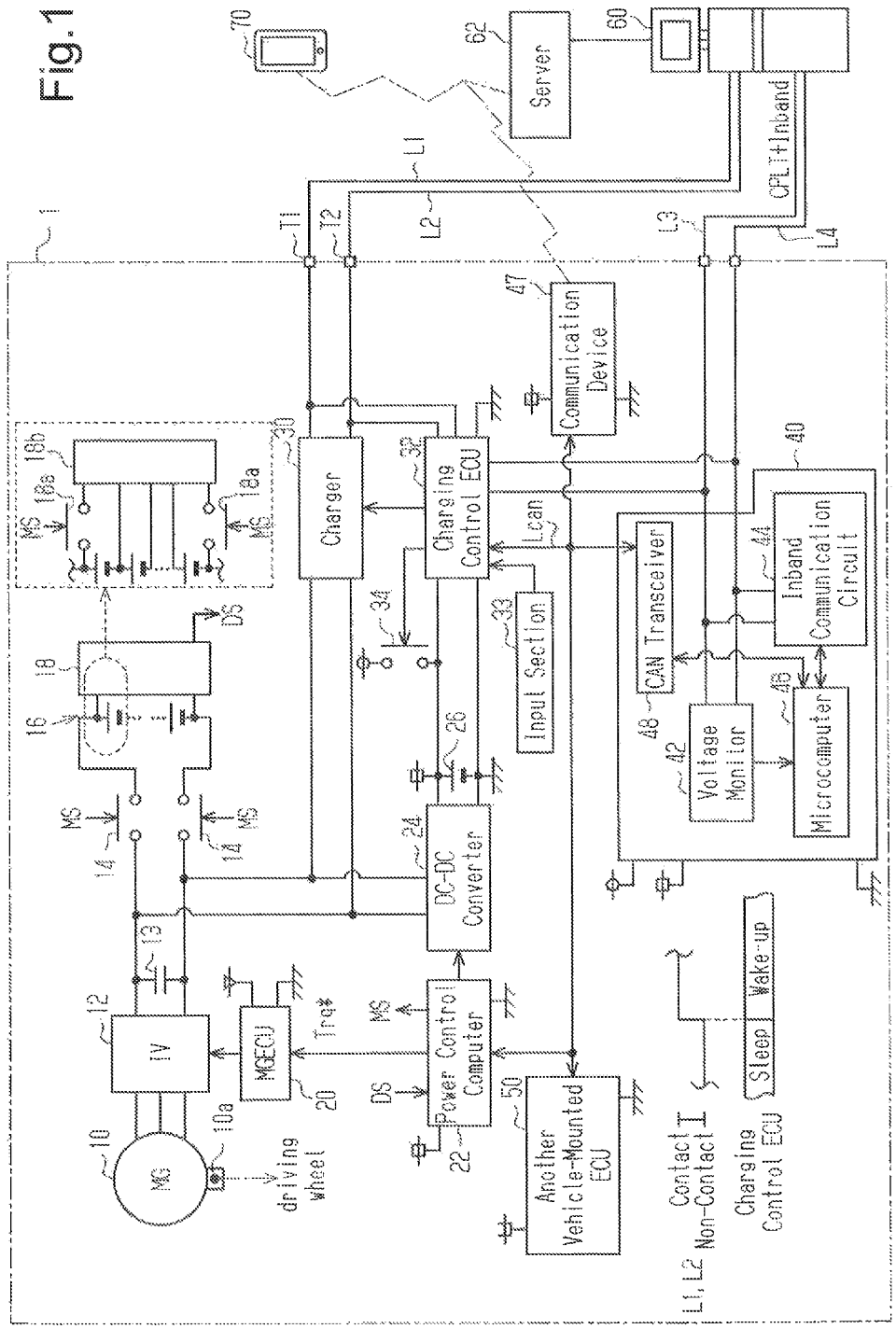
FIG. 1 is a block diagram representing the configuration of a system, as a whole, according to a first embodiment of the present invention.

As shown in FIG. 1, a vehicle 1 is an electric vehicle and includes a motor-generator 10 serving as a motor for generating drive force of the vehicle 1. The motor-generator 10 has a rotary shaft 10a, which is mechanically joined to the drive wheels. The motor-generator 10 is connected to an inverter 12, which is a DC-AC inverting circuit. A smoothing capacitor 13 is connected to a pair of input terminals of the inverter 12. The two input terminals of the inverter 12 are connected to a high-voltage battery 16, which is a secondary cell, through system main relays (SMRs) 14. The high-voltage battery 16 is an assembled battery, which is a serial connection body of battery cells. The high-voltage battery 16 is connected to a battery monitor device 18, which is configured by an integrated circuit for monitoring the states of the battery cells. The battery monitor device 18 includes a monitor unit 18b, which monitors, separately for respective blocks each configured by adjacent ones of the battery cells of the assembled battery, the states of the battery cells of each of the blocks. The monitor unit 18b is connected to the positive terminal and the negative terminal of each of the battery cells in each block. The monitor unit 18b is connected to the positive terminal and the negative terminal of each block through power source switches 18a. The block corresponding to the monitor target serves as the power source for the monitor unit 18b. The power source is turned on and off through the power source switches 18a. By operating the power source switches 18a to close, the power source of the monitor unit 18b is turned on.

The inverter 12 controls the motor-generator 10. The inverter 12 is operated by an electronic control unit (MGECU) 20. The MGECU 20 operates the inverter 12 in correspondence with a torque command value Trq* provided by a power control computer 22 such that the torque of the motor-generator 10 becomes equal to the torque command value Trq*.

The power control computer 22 is an electronic control unit, which controls various types of devices mounted in the vehicle each as a control target. The power control computer 22 selectively opens and closes the SMRs 14 by outputting an operation signal MS to each of the SMRs 14. The power control computer 22 also selectively opens and closes the power source switches 18a by outputting an operation signal MS to each of the power source switches 18a. When the power source of the monitor unit 18b is turned on, the power control computer 22 receives a monitoring result signal DS output by the monitor unit 18b and thus obtains monitoring results of the battery cells.

The high-voltage battery 16 is connected to a DC-DC converter 24 through the SMRs 14. The DC-DC converter 24 is a power converting circuit. The DC-DC converter 24 decreases the terminal voltage of the high-voltage battery 16 and supplies the terminal voltage to the auxiliary-device battery 26, thus charging the auxiliary-device battery 26 with the electric charge stored by the high-voltage battery 16. The full power storage amount of the auxiliary-device battery 26 is smaller than the full power storage amount of the high-voltage battery 16. The auxiliary-device battery 26 is a power source for vehicle-mounted electronic devices including the power control computer 22. The DC-DC converter 24 is driven in response to a command from the power control computer 22.

The high-voltage battery 16 is connected to a charger 30 through the SMRs 14. The charger 30 is a power converting circuit that charges the high-voltage battery 16 from an external power source device 60 through terminals T1, T2 of the vehicle.

A charging control ECU 32 is an electronic control unit for operating the charger 30. The charging control ECU 32 performs control to charge the high-voltage battery 16 from the external power source device 60 based on a user request, which is input through an input section 33. When a charging gun is connected to the terminals T1, T2, the charging control ECU 32 monitors whether the charging gun is connected to charging lines L1, L2. If the charging gun is connected to the charging lines L1, L2, as shown in the lower left part of FIG. 1, a sleep mode with a small power consumption amount is switched to a wake-up mode with a great power consumption amount. Such switching is performed for the fact that the power consumption amount needed to operate the charger 30 is greater than the power consumption amount needed to monitor connection to the charging lines L1, L2.

A procedure for charging from the external power source device 60 is performed by connecting the charging lines L1, L2 to the terminals T1, T2 and connecting communication lines L3, L4 to terminals T3, T4. A control pilot signal (a CPLT signal) is transmitted, from the external power source device 60 to the vehicle 1 through the communication lines L3, L4. Interactive communication between the vehicle 1 and the external power source device 60, which is in-band communication, is performed by superimposing a high-frequency signal, which has a frequency higher than the CPLT signal, on the CPLT signal using the communication lines L3, L4.

The in-band communication is executed by a charging communication ECU 40. The charging communication ECU 40 includes a voltage monitor circuit 42, an in-band communication circuit 44, a microcomputer 46, and a CAN transceiver 48. The voltage monitor circuit 42 detects the potential difference of the communication line L3 with respect to the communication line L4 for indicating the reference potential, which is the voltage of the communication line L3. The in-band communication circuit 44 superimposes the high-frequency signal on the CPLT signal, which is transmitted through the communication line L3, to perform the in-band communication. The microcomputer 46 operates the in-band communication circuit 44 in response to input of a voltage detected by the voltage monitor circuit 42. The CAN transceiver 48 performs CAN (Controller Area Network) communication with the charging control ECU 32 and the like through a CAN communication line Lcan.

The in-band communication circuit 44, the microcomputer 46, and the CAN transceiver 48 are each switchable between the sleep mode having the small power consumption amount and the wake-up mode having the great power consumption amount. When the in-band communication circuit 44 is in the wake-up mode, the in-band communication is allowed. When the in-band communication circuit 44 is in the sleep mode, the in-band communication circuit 44 monitors whether a command to switch to the wake-up mode is provided by the microcomputer 46. When the CAN transceiver 48 is in the wake-up mode, CAN communication is allowed. When the CAN transceiver 48 is in the sleep mode, the CAN transceiver 48 monitors whether a command to switch to the wake-up mode is provided by the microcomputer 46. When the microcomputer 46 is in the sleep mode, the microcomputer 46 performs a procedure for determining whether a condition for switching the microcomputer 46 to the wake-up mode becomes satisfied.

The charging communication ECU 40 is connected to the auxiliary-device battery 26 through a power source relay 34 and connected to the auxiliary-device battery 26 by bypassing the power source relay 34.

When preparation for charging is completed based on a communication result transmitted from the charging communication ECU 40, the charging control ECU 32 decreases the voltage of the communication line L3 at the time the CPLT signal is a logic H. The charging control ECU 32 selectively opens and closes the power source relay 34, which connects the auxiliary-device battery 26 to the charging communication ECU 40. The charging control ECU 32 is connected to the auxiliary-device battery 26 without the power source relay 34.

The vehicle 1 includes a communication device 47, which is capable of performing wireless communication with an external device using a telephone line or the like. The communication device 47 is an electronic device capable of communicating with the charging control ECU 32 and the like through the CAN communication line Lcan.

The communication device 47, the charging control ECU 32, the charging communication ECU 40, the power control computer 22, and another vehicle-mounted ECU 50 are connected to the CAN communication line Lcan. The other vehicle-mounted ECU 50 is an electronic control unit or the like, which controls the temperature in the passenger compartment by operating a vehicle-mounted air conditioner or executes anti-theft control of the vehicle 1.

The external power source device 60 is capable of communicating with a server 62. The server 62 obtains information about the electric power charges, which are varied depending on the time and the season. The server 62 is capable of communicating with the communication device 47 and a portable device 70 carried by the user. For example, to employ the portable device 70, which is a generally used multifunction telephone device, in communication for charging the high-voltage battery 16, an application program for communication for charging may be installed in the portable device 70 in advance.

Figure 2:
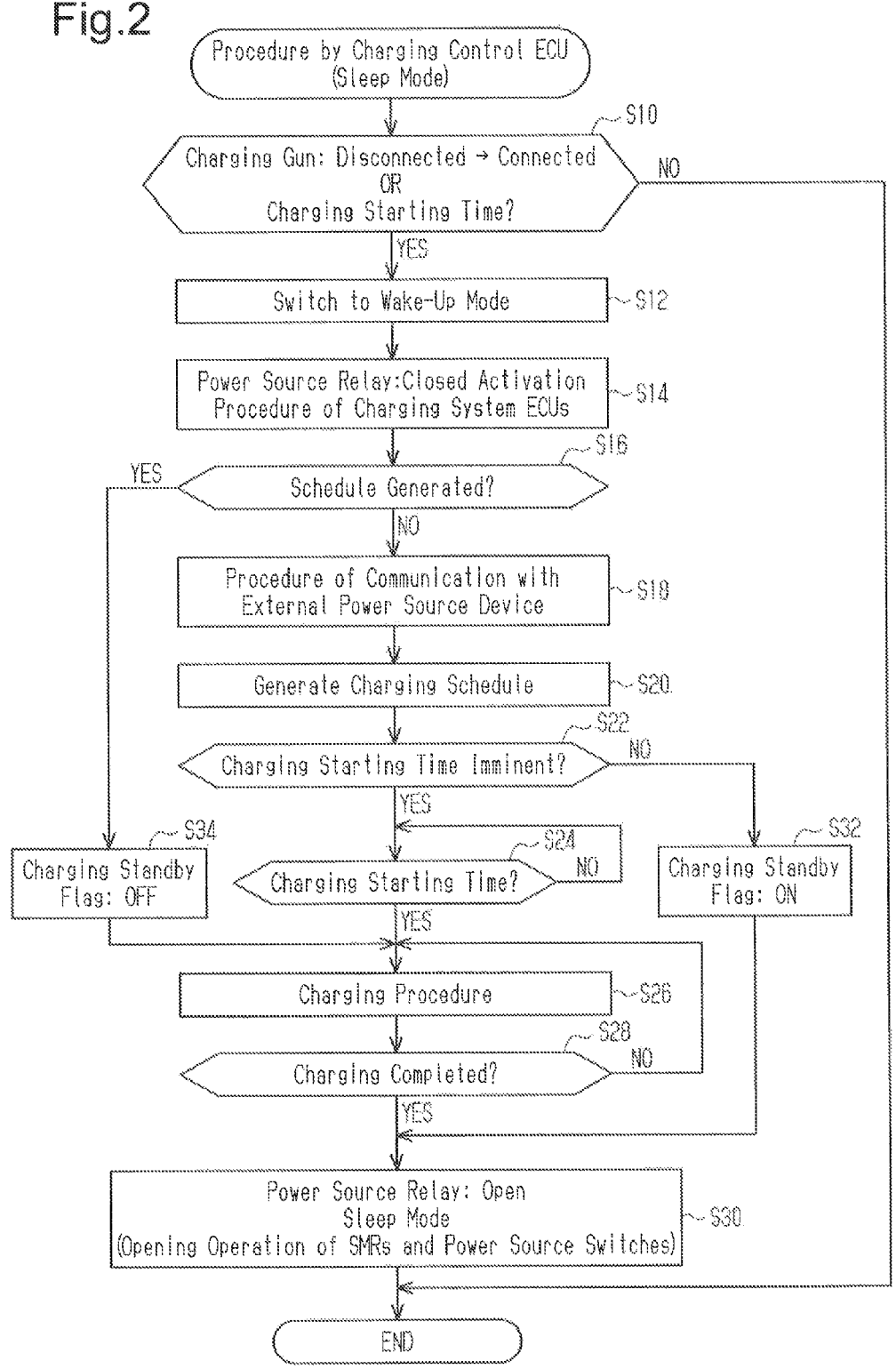
FIG. 2 is a flowchart representing procedure steps of a charging control ECU.

A procedure for charging the high-voltage battery 16 from the external power source device 60 will hereafter be described with reference to FIG. 2. The flowchart of FIG. 2 represents a charging procedure executed by the charging control ECU 32. The charging procedure is repeated by predetermined cycles when the condition that the charging control ECU 32 is in the sleep mode is satisfied.

With reference to FIG. 2, the charging control ECU 32 first determines whether the charging gun is connected to the terminals T1, T2 or it is the time to start charging (S10). The charging control ECU 32 monitors, in the sleep mode, whether the charging lines L1, L2 are connected to the terminals T1, T2 to determine whether the charging gun is connected to the terminals T1, T2. If the charging control ECU 32 is held in a standby state in the sleep mode until it is the time to starting charging, the charging control ECU 32 determines whether it is the time to start charging depending on whether a standby procedure is completed.

When the charging gun is connected to the terminals T1, T2 or it is the time to start charging (S10: YES), the charging control ECU 32 is switched to the wake-up mode (S12). Then, the charging control ECU 32 operates the power source relay 34 to close and activates the power control computer 22, which is used in the charging procedure of the high-voltage battery 16, through the CAN communication line Lcan (S14). In this manner, the power control computer 22 is switched to the wake-up mode. Normally, the user connects the charging gun to the vehicle 1 after parking and alighting from the vehicle 1. At this stage, the power control computer 22 is in the sleep mode. The power control computer 22 is periodically switched to the wake-up mode to turn on the power source switches 18a, and thus monitor the state of the high-voltage battery 16. However, such procedures are not executed using connection of the charging gun as a trigger. Therefore, the charging control ECU 32 switches the power control computer 22 to the wake-up mode using the CAN communication. After the power control computer 22 is switched to the wake-up mode, the power control computer 22 starts to prepare for the charging procedure of the high-voltage battery 16. This operates the SMRs 14 to close, thus electrically connecting the charger 30 and the high-voltage battery 16 to each other. The power source switches 18a are also operated to close to activate the monitor unit 18b. The monitor unit 18b thus starts to monitor the states of the battery cells of the high-voltage battery 16. As the power consumption amount of the charging control ECU 32, the power control computer 22, and the charging communication ECU 40 increases, the power storage amount of the auxiliary-device battery 26 decreases. Therefore, the power control computer 22 may drive the DC-DC converter 24 to charge the auxiliary-device battery 26 with the potential stored, by the high-voltage battery 16.

Subsequently, the charging control ECU 32 determines whether a charging schedule has been generated (S16). Specifically, it is determined whether the positive determination in the procedure of Step S10 has been caused by connection of the charging gun to the terminals T1, T2 or the fact that it was the time to start charging according to the charging schedule. If the charging schedule is not yet generated (S16: NO), the charging control ECU 32 commands the charging communication ECU 40 to perform the in-band communication with the external power source device 60. The charging control ECU 32 thus obtains the relationship between the time zones and the electric power charges and the relationship between the time zones and the upper limit of the chargeable power amount as electric power information from the external power source device 60 (S18). When the charging gun is connected to the terminals T1, T2, normally, not only the charging lines L1, L2 are connected to the terminals T1, T2 but also the communication lines L3, L4 are connected to the terminals T3, T4. Then, the external power source device 60 outputs the CPLT signal to the communication line L3. This causes the charging communication ECU 40 to superimpose the high-frequency signal on the CPLT signal to execute the in-band communication. In this manner, the charging control ECU 32 obtains the electric power information, which is obtained by the external power source device 60 through the server 62, by means of the charging communication ECU 40.

Next, based on the aforementioned electric power information, the charging control ECU 32 generates the charging schedule (S20). At this stage, if the electric power charges are less expensive for a later time than for the current time point, the charging starting time is set to the later time with priority over the current time point. However, if a requested charging completion time, which is input through the input section 33, is early, the requested charging completion time has priority. That is, in a case in which charging is performed with maximum charging electric power but cannot, be completed on the requested charging completion time, the charging control ECU 32 generates a charging schedule such that charging is started early regardless of the electric power charges.

Based on the charging schedule, the charging control ECU 32 determines whether the time difference between the charging starting time and the current time point is small (S22). A small time difference indicates that the power consumption amount of the vehicle 1 does not decrease beyond a predetermined amount when the power control computer 22, the charging control ECU 32, and the charging communication ECU 40, which have been switched to the sleep mode, are switched to the wake-up mode immediately before the charging starting time.

When the time difference between the charging starting time and the current time point is small (S22: YES), the charging control ECU 32 determines whether it is the time to start charging (S24). If it is not the time to start charging (S24: NO), the charging control ECU 32 is held in a standby state until it is the time to start charging. When it is the time to start charging (S24: YES), the charging control ECU 32 executes the charging procedure (S26). In this manner, the charging control ECU 32 operates the charger 30 to control the electric power supplied from the external power source device 60 to the high-voltage battery 16. The charging control ECU 32 executes the charging procedure until charging is completed (S28: NO). When charging is completed (S28: YES), the charging control ECU 32 operates the power source relay 34 to open and is switched to the sleep mode (S30). Completion of charging indicates that the charging rate (SOC) of the high-voltage battery 16 is "100%" or equal to a user-commanded charging rate. Before the charging control ECU 32 is switched to the sleep mode, the charging control ECU 32 commands the power control computer 22 to switch to the sleep mode through the CAN communication. This causes the power control computer 22 to operate the SMRs 14 and the power source switches 18a to open and then switch to the sleep mode.

If the time difference between the charging starting time and the current time point is not small (S22: NO), the charging control ECU 32 turns on a charging standby flag, which is a flag indicating that charging is held in a standby state (S32), and carries out Step S30. Then, if a positive determination is made in Step S16 in a subsequent cycle after the procedure of FIG. 2 is suspended, the charging control ECU 32 turns off the charging standby flag (S34) and executes the charging procedure (S26). When the procedure of Step S30 is completed or a negative determination is made in Step S10, the charging control ECU 32 suspends the series of procedure.

As has been described, in the first embodiment, if the cost caused by the charging procedure can be decreased by delaying the timing for executing the charging procedure even after the charging gun is connected to the terminals T1, T2, execution of the charging procedure is delayed. However, the relationship between the time zones and the electric power charges are variable. Therefore, in a case of demand response that varies the electric power charges in correspondence with electric power demand, the electric power charges corresponding to the time zones may be updated in correspondence with variation of the electric power demand. Similarly, the relationship between the time zones and the upper limit of the charging electric power is variable. As a result, even after the charging schedule is generated, the electric power information input in the charging schedule may be updated before the charging starting time if the time difference between the current time and the charging starting time is great. In this case, by changing the charging schedule based on the updated electric power information, the cost caused by the charging procedure may be decreased or charging may be completed before a user-commanded charging completion time.

In the first embodiment, in this regard, monitoring is performed as to whether the information input in the charging schedule has been updated through communication with the external power source device 60, which is performed by predetermined cycles, in the standby period until the charging starting time. Particularly, in the first embodiment, the charging communication ECU 40 solely monitors whether the information input in the charging schedule has been updated. The reason for such sole monitoring is that the electric power consumption amount of the vehicle 1 increases if the charging control ECU 32 is switched to the wake-up mode as in the procedure of FIG. 2. The procedure of sole monitoring by the charging communication ECU 40 is carried out as follows. That is, if the charging control ECU 32 operates the power source relay 34 to open in Step S30 of FIG. 2 but the charging standby flag is on, the charging communication ECU 40 is switched to the sleep mode without shutting down the power source of the charging communication ECU 40. This procedure is carried out, when the charging standby flag is on, by informing the charging communication ECU 40 of the fact that the charging standby flag is on at the time of the procedure of Step S30 by means of the charging control ECU 32 through the CAN communication.

Figure 3:
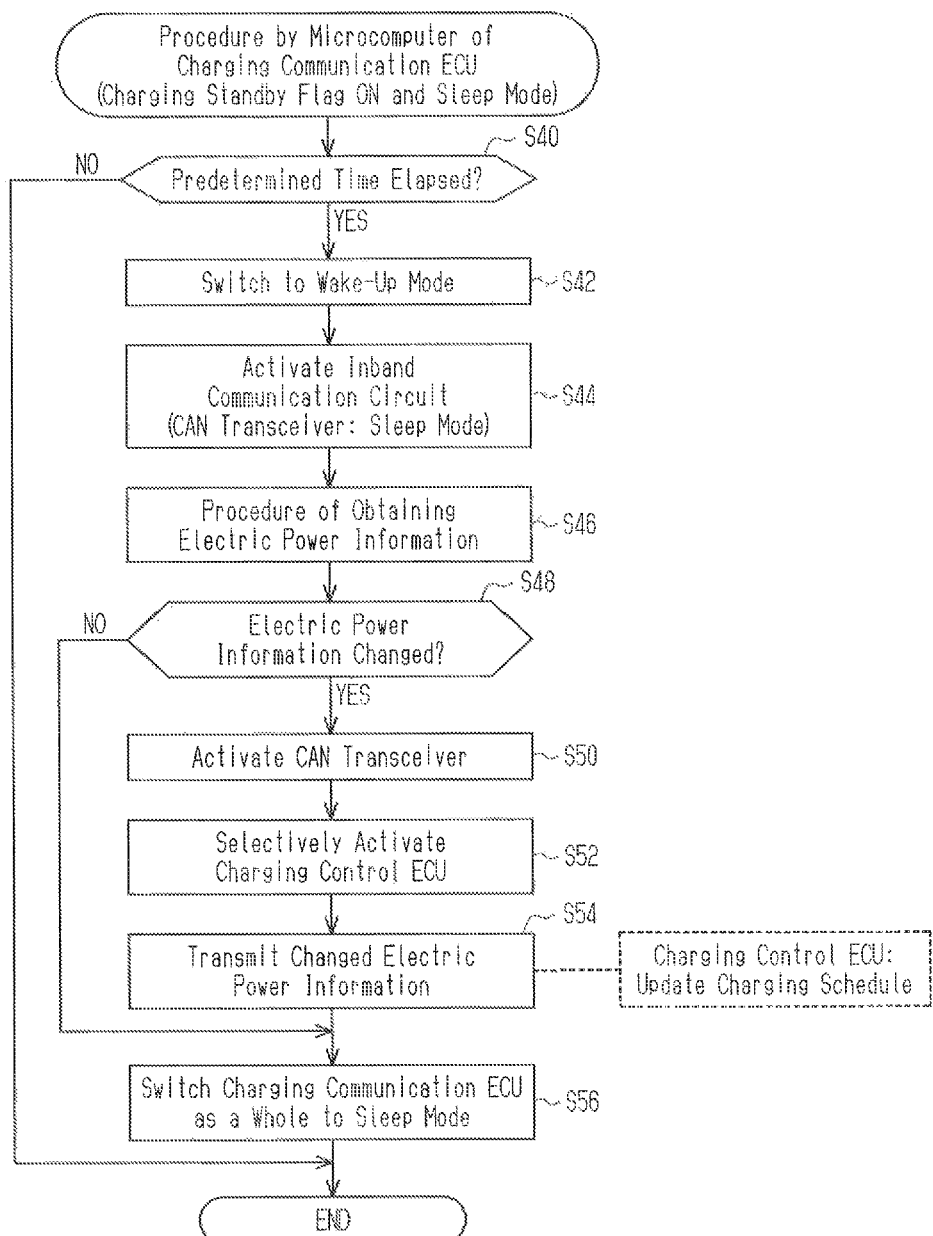
FIG. 3 is another flowchart representing procedure steps of a charging communication ECU.

FIG. 3 represents a procedure of the microcomputer 46 of the charging communication ECU 40. The procedure is repeated by predetermined cycles when the charging standby flag is on and the charging communication ECU 40 is in the sleep mode.

Referring to FIG. 3, the microcomputer 46 first determines whether a certain time has elapsed since switch to the sleep mode (S40). The certain time is set in correspondence with the time interval by which the electric power information is updated. If the certain time has elapsed (S42: YES), the microcomputer 46 is switched to the wake-up mode (S42). Subsequently, the microcomputer 46 selectively activates the in-band communication circuit 44 (S44). In other words, the microcomputer 46 selectively switches the in-band communication circuit 44 to the wake-up mode. At this stage, the microcomputer 46 maintains the CAN transceiver 48 in the sleep mode.

Then, the microcomputer 46 operates the in-band communication circuit 44 to execute in-band communication with the external power source device 60 and obtains the electric power information from the server 62 (S46). Based on the obtained electric power information, the microcomputer 46 determines whether the information input in the charging schedule has been changed (S48). When the electric power information is unchanged (S48: NO), the microcomputer 46 switches the charging communication ECU 40 to the sleep mode (S56). At this stage, the microcomputer 46 switches the in-band communication circuit 44 to the sleep mode and then switches to the sleep mode.

If the electric power information has been changed (S48: YES), the microcomputer 46 activates the CAN transceiver

48 (S50). In other words, the microcomputer 46 is switched to the wake-up mode to activate the CAN transceiver 48. Then, the microcomputer 46 selectively activates the charging control ECU 32 through the CAN transceiver 48 (S52). In other words, the microcomputer 46 selectively switches the charging control ECU 32 to the wake-up mode. The microcomputer 46 has a plurality of types of command signals for switch to the wake-up mode. One of the types of command signals is a command signal for switching the charging control ECU 32 exclusively to the wake-up mode.

The microcomputer 46 transmits the changed electric power information to the charging control ECU 32 (S54). The charging control ECU 32 updates the charging schedule based on the changed electric power information.

After transmitting the changed electric power information, the microcomputer 46 switches the charging communication ECU 40 as a whole to the sleep mode (S56). That is, the microcomputer 46 switches the in-band communication circuit 44 and the CAN transceiver 48 to the sleep mode and then switches to the sleep mode. The microcomputer 46 suspends the series of procedure when the procedure of Step S56 is completed or a negative determination is made in Step S40.

Figure 4:
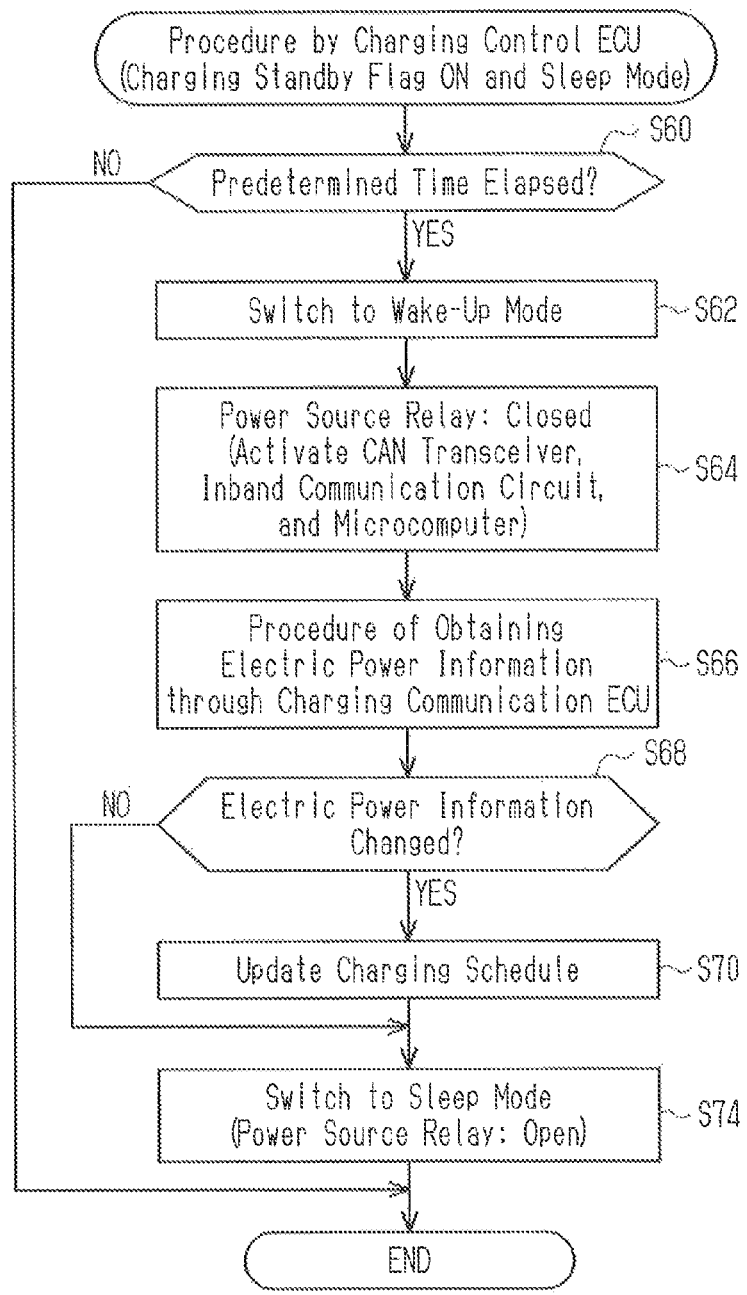
FIG. 4 is a flowchart representing procedure steps of a charging control ECU of a comparative example.

FIG. 4 represents a comparative example for comparison with the first embodiment. The procedure for monitoring change of the electric power information represented in FIG. 4 is carried out by activating the charging control ECU 32. The procedure is repeated by predetermined cycles when the charging standby flag is maintained on by the charging control ECU 32 and the charging control ECU 32 is in the sleep mode.

With reference to FIG. 4, the charging control ECU 32 determines whether a certain time has elapsed since switch to the sleep mode (S60). If the certain time has elapsed (S60: YES), the charging control ECU 32 is switched to the wake-up mode (S62). Subsequently, the charging control ECU 32 operates the power source relay 34 to close (S64). This switches the in-band communication circuit 44, the microcomputer 46, and the CAN transceiver 48 of the charging communication ECU 40 to the wake-up mode.

Next, the charging control ECU 32 commands the charging communication ECU 40 through CAN communication to perform in-band communication. The charging control ECU 32 then obtains information including the electric power charges through the in-band communication (S66). In certain settings, the power control computer 22 is switched to the wake-up mode through the CAN communication such that the same state as the state caused by Step S14 of FIG. 2 is brought about.

Then, the charging control ECU 32 determines whether the electric power information has been changed (S68). If the electric power information has been changed (S68: YES), the charging control ECU 32 updates the charging schedule (S70). When the charging schedule is updated or if the electric power information is unchanged (S68: NO), the charging control ECU 32 operates the power source relay 34 to open and is switched to the sleep mode (S74). In some cases, the power control computer 22 may also be set to switch to the wake-up mode when the charging control ECU 32 is switched to the wake-up mode and executes the CAN communication. In these cases, the charging control ECU 32 commands the power control computer 22 to switch to the sleep mode.

When the procedure of Step S74 is completed or a negative determination is made in Step S60, the charging control ECU 32 suspends the series of procedure.

The first embodiment has the advantages described below.

(1) If the charging control ECU 32 and the charging communication ECU 40 are in the sleep mode before the charging starting time, the microcomputer 46 and the in-band communication circuit 44 of the charging communication ECU 40 are switched to the wake-up mode to perform in-band communication (S46). This decreases the power consumption amount of the vehicle 1 compared to a case in which the charging control ECU 32 is switched to the wake-up mode.

(2) To check if the electric power information has been changed, the charging communication ECU 40 (the microcomputer 46) is selectively switched to the wake-up mode. This prevents the power control computer 22 from executing the procedure for preparation for charging. Therefore, consumption of the potential stored by the high-voltage battery 16 by the monitor unit 18*b* is avoided. Also, consumption of the potential stored by the high-voltage battery 16 caused by operating the SMRs 14 to close to charge the smoothing capacitor 13 is avoided. In some cases, before the power control computer 22 is switched to the sleep mode, a procedure of discharging potential from the smoothing capacitor 13 by operating the inverter 12 by means of the MGECU 20 may be executed to ensure safety. In these cases, by avoiding charging of the smoothing capacitor 13, the number of times by which the inverter 12 is driven is decreased.

(3) To execute the procedure of determining whether the electric power information has been changed, the in-band communication circuit 44 is selectively switched to the wake-up mode and the CAN transceiver 48 is maintained in the sleep mode (S44). This decreases the power consumption amount of the vehicle 1 compared to a case in which the CAN transceiver 48 is switched to the wake-up mode.

(4) If the electric power information has been changed, the charging communication ECU 40 informs the charging control ECU 32 of the changed electric power information such that the charging schedule is updated (S54). The charging schedule is thus changed to an appropriate schedule.

(5) To inform the charging control ECU 32 of the fact that the electric power information has been changed through CAN communication, the charging communication ECU 40 selectively switches the charging control ECU 32, out of the devices connected to the CAN communication line Lcan, to the wake-up mode. This maximally decreases the power consumption amount of the vehicle 1.

Second Embodiment

A second embodiment will hereafter be described with reference to FIG. 5, mainly on differences between the first embodiment and the second embodiment.

In the second embodiment, when the charging communication ECU 40 switches the charging control ECU 32 to the wake-up mode through CAN communication, the other electronic devices connected to the CAN communication line Lcan are also switched to the wake-up mode. That is, when the charging communication ECU 40 commands the charging control ECU 32 to switch to the wake-up mode through the CAN communication, the power control computer 22 and the other vehicle-mounted ECU 50 are also switched to the wake-up mode.

FIG. 5 represents a procedure of the microcomputer 46 of the charging communication ECU 40 according to the second embodiment. The procedure is repeated by predetermined cycles when the charging standby flag is on and the charging communication ECU 40 is in the sleep mode. Identical reference numerals are given to steps of FIG. 5 that are identical with corresponding steps of FIG. 3.

Referring to FIG. 5, after the CAN transceiver 48 is switched to the wake-up mode (S50), the microcomputer 46 switches the charging control ECU 32, the power control computer 22, and the other vehicle-mounted. ECU 50 to the wake-up mode through the CAN communication. The microcomputer 46 then transmits the changed electric power information to the charging control ECU 32 through the CAN communication (S54). The microcomputer 46 also obtains vehicle information from the other vehicle-mounted ECU 50 (S54). The vehicle information includes information regarding the temperature in the passenger compartment, the charging rate of the high-voltage battery 16, and security information. The microcomputer 46 obtains the temperature information from an electronic control unit, that operates a vehicle-mounted air conditioner. The microcomputer 46 also obtains the charging rate of the high-voltage battery 16 from the power control computer 22 as a value calculated by the power control computer 22 based on the monitoring result signal DS, which is output by the monitor unit 18b. Further, the microcomputer 46 obtains the security information from an anti-theft electronic control unit. The security information includes information regarding, if any, a suspicious approach to the vehicle 1.

The charging communication ECU 40 transmits the obtained information to the portable device 70 through the communication device 47 (S82). In this manner, the user is provided with the obtained information.

As has been described, in the second embodiment, when the charging control ECU 32 is switched to the wake-up mode to change the charging schedule, the other vehicle-mounted ECU 50 and the like are also switched to the wake-up mode. The user is thus provided with information regarding the current state of the vehicle.

The correspondence relationship between the components of the means for solving the problem and the components of the illustrated embodiments will hereafter be described.

External Power Source Device . . . 60, Vehicle-Mounted Power Storage Device . . . 16, 26, Communication Control Section . . . 40, Supplying/Receiving Control Section . . . 32, "Great Power State of Supplying/Receiving Control Section" . . . "Wake-up Mode", "Decreased State of Supplying/ Receiving Control Section" . . . "Sleep Mode", "Interactive Communication Performed When Supplying/Receiving Control Section Is in Decreased State" . . . S44, S46, "Great Power State of Communication Control Section" . . . "Wake-Up Mode", "Decreased State of Communication Control Section" . . . "Sleep Mode", "Condition for Starting Interactive Communication" . . . "Condition For Positive Determination in S40, Schedule Generating Section . . . S20, "Condition that. Standby Time Is Not Less Than Predetermined Time Satisfied" . . . Negative Determination in S22, Vehicle External Communication Circuit . . . 44, Vehicle Internal Communication. Circuit . . . 48, Operating Section . . . 46, "Selective Switch of Vehicle External Communication Circuit to Great Power State" . . . S44, Schedule Generating Section . . . S20, "Change of Schedule by Means of Schedule Generating Section" . . . S54, Procedure of S20 Eased on Procedure of S12, Predetermined Control Section . . . 50, "Monitoring Whether Command for Switch to Great Power State is Output" . . . Charging Control ECU Switchable to Wake-Up Mode in S52, "Command for Switch" . . . S52, Predetermined Control Section . . . 50, "Switch to Great Power State Allowing Transmission of Information to Communication Control Section" . . . S80 Enabled by S52a, Informing Section . . . S82

The illustrated embodiments may be modified to the forms described below.

[Decreased State of Supplying/Receiving Control Section (Charging Control ECU 32)]

The decreased state of the charging control ECU 32 at the time of communication with the charging communication ECU 40 may be a state in which the power source is shut down, other than the sleep mode. Specifically, the charging communication ECU 40 may operate an opening/closing device such as a relay, which is arranged between the charging control ECU 32 and the auxiliary-device battery 26. This allows the power source of the charging control. ECU 32 to be shut down when the charging communication ECU 40 operates the opening/closing device to open after the charging gun is connected to the terminals T1, T2 and the charging schedule is generated.

[Great Power State of Supplying/Receiving Control Section (Charging Control ECU 32)]

This state is not restricted to a single state in which charging control, including operation of the charger 30, and generation of the charging schedule are both allowed. The state may include two states, for example, which are a state in which the generation of the charging schedule is allowed but the charging control is prohibited and a state in which the charging control is permitted. In these cases, the great power state is a condition necessary but not sufficient for allowing the charging control.

[Decreased State of Vehicle External Communication Circuit (In-Band Communication Circuit 44)]

This state is not restricted to the sleep mode but may be a state in which the power source is shut down. In this case, the microcomputer 46 may operate an opening/closing device such as a relay, which is arranged between the in-band communication circuit 44 and the auxiliary-device battery 26.

[Decreased State of Vehicle Internal Communication Circuit (CAN Transceiver 48)]

This state is not restricted to the sleep mode but may be a state in which the power source is shut down. In this case, the microcomputer 46 may operate an opening/closing device such as a relay, which is arranged between the CAN transceiver 48 and the auxiliary-device battery 26.

[Decreased State of Predetermined Control Section (Other Vehicle-Mounted ECU 50)]

This state is not restricted to the sleep mode but may be a state in which the power source is shut down. In this case, the power control computer 22 may operate an opening/ closing device such as a relay, which is arranged in the electric path between the other vehicle-mounted ECU 50 and the auxiliary-device battery 26.

[Path of Electric Power Supply to Communication Control Section]

The path through which the auxiliary-device battery 26 and the charging communication ECU 40 are connected to each other directly without the power source relay 34 may be omitted. In this case, a normally-closed type relay is employed as the power source relay 34 such that the closed state of the power source relay 34 is maintained even when the charging control ECU 32 is in the sleep mode. This allows the charging communication ECU 40 to switch to the sleep mode in a state in which, the charging control ECU 32 is in the sleep mode. Therefore, when the charging control ECU 32 is in the sleep mode, the charging communication ECU 40 can switch to the wake-up mode autonomously.

The path through which the auxiliary-device battery 26 and the charging communication ECU 40 are connected to each other through the power source relay 34 may be omitted. In this case, as long as monitoring can be performed, with the charging communication ECU 40 maintained in the sleep mode, as to whether a command for switch to the wake-up mode has been provided from the charging control ECU 32 through CAN communication, the switch to the wake-up mode can be achieved in response to the command.

[Schedule Generating Section]

This section is not restricted to a section configured by the charging control ECU 32. The schedule generating section may be configured by, for example, hardware different from the charging communication ECU 40 and the charging control ECU 32. Alternatively, the schedule generating section may be configured by the microcomputer 46 of the charging communication ECU 40. If the schedule generating section is configured by the charging communication ECU 40, it is preferable to maintain the charging control ECU 32 in the sleep mode during the period in which the schedule is generated.

In this case, the schedule does not necessarily have to be generated, through connection of the charging gun. For example, when the condition that the charging gun is connected to the terminals T1, T2 is satisfied, the charging communication ECU 40 may be switched to the wake-up mode by predetermined cycles and obtain the electric power information. The charging schedule may be generated at the time of the first switch of the charging communication ECU 40 to the wake-up mode. In this case, if it is determined that in-band communication is allowed, the charging communication ECU 40 may determine that the charging gun is connected.

[Connection Path Between Charger 30 and High-Voltage Battery 16]

This path is not restricted to a path having conductivity with the motor-generator 10 (the inverter 12). For example, the charger 30 may be connected to a position closer to the high-voltage battery 16 than the SMRs 14 and an opening/closing device such as a relay for selectively opening and closing the electrical path between the high-voltage battery 16 and the charger 30 may be provided. In this case, when the high-voltage battery 16 is charged using the charger 30, electrical connection between the inverter 12 and the high-voltage battery 16 may be blocked. The smoothing capacitor 13 is thus not charged when the high-voltage battery 16 is charged using the charger 30.

[Vehicle Internal Communication]

The vehicle internal communication is not restricted to CAN communication. The vehicle internal communication is not restricted to wire communication either but may be wireless communication. In this case, the CAN transceiver 48 may be modified to a wireless device.

[Vehicle External Communication]

The vehicle external communication is not restricted to in-band communication as long as the electric power information is obtained through the communication.

[External Charging Device]

This device is not restricted to a device using the charging lines L1, L2 but may be a device that performs non-contact power supply. In this case, when the charging communication ECU 40 obtains the electric power information through communication with the exterior, the power consumption amount is decreased by maintaining the charging control ECU 32 in the sleep mode.

[Supplying/Receiving of Electric Power]

Supplying/receiving of electric power is not restricted to charging of the high-voltage battery 16 but may be power supply (reverse power flow) from the high-voltage battery 16 to the external power source device. In this case, the period in which the reverse power flow is allowed to be performed and the information regarding the electric power charges (the electric power information) caused by the reverse power flow are variable. It is thus effective to switch the microcomputer 46 to the wake-up mode periodically to monitor change of the electric power information.

[Power Converting Circuit for Supplying/Receiving of Electric Power]

The power converting circuit operated by the supplying/receiving control section is not restricted to the charger 30, which is used exclusively for this purpose, but may be configured using a section of the circuit of the inverter 12. Also, if the reverse power flow is performed, a power converting circuit such as a DC-DC converter for outputting electric power from the high-voltage battery 16 to the external power source device 60 may be employed.

[User-Side Device for Informing User]

This device is not restricted to the portable device 70. The device may be any other device as long as the device has a function of informing the user of information through visual or audio information. For example, a home-use energy management device may be employed.

[Other Components]

A hybrid vehicle including a vehicle-mounted power storage device and an internal combustion engine may be employed as the vehicle. Further, although the vehicle of the illustrated embodiments has a single rotary device, which is mechanically connected to the drive wheels, a series-parallel hybrid vehicle including two rotary devices may be employed.

The power sources of the charging control ECU 32 and the like may be fuel cells or the like used exclusively for these purposes, other than the auxiliary-device battery 26. In this case, the power sources of the charging control ECU 32 and the like are not charged through charging from the external power source device 60.

The invention claimed is:

1. A power management device for vehicles employed in a vehicle including a vehicle-mounted power storage device that selectively supplies and receives electric power with respect to an external power source device, the power management device comprising:

a communication control section that performs interactive communication to selectively supply and receive the electric power with respect to the external power source device;

a supplying/receiving control section that controls supplying/receiving of the electric power, and a schedule generating section for generating a schedule for selectively supplying and receiving the electric power based on information obtained by the communication control section through the interactive communication, the supplying/receiving control section is switchable between a great power state and a decreased state in which a power consumption amount is smaller than in the great power state, if a condition that the supplying/receiving control section is in the great power state is satisfied, control of the supplying/receiving of the electric power is allowed, the supplying/receiving control section is switched to the decreased state if a condition that the standby time until the supplying/receiving of the electric power is started according to the schedule generated by the schedule generating section is not less than a predetermined time is satisfied, if the supplying/receiving control section is in the decreased state before the vehicle-mounted power storage device and the external power source device selectively supply and receive the electric power with respect to each other, the communication control section performs the interactive communication, when the supplying/receiving control section is in the decreased state, in the standby period until the supplying/receiving of the electric power is started, if it is determined that the electric power information including the time zones and the electric power charges or the upper limit of the charging electric power has been changed based on the information obtained through communication with the external power source device, the communication control section changes the schedule by means of the schedule generating section.

2. The power management device according to claim 1, wherein the communication control section is switchable between a great power state and a decreased state in which a power consumption amount is smaller than in the great power state;

the interactive communication is allowed by switching the communication control section to the great power state; and when the communication control section is in the decreased state and the supplying/receiving control section is in the decreased state, the communication control section is switched to the great power state to perform the interactive communication if a condition for starting the interactive communication is satisfied.

3. The power management device according to claim 2, the communication control section is switched to the decreased state if a condition that a standby time until the supplying/receiving of the electric power is started according to the schedule generated by the schedule generating section is not less than a predetermined time is satisfied.

4. The power management device according to claim 2, wherein the communication control section is capable of communicating with the supplying/receiving control section;

the communication control section includes a vehicle external communication circuit for performing the interactive communication, a vehicle internal communication circuit for communicating with the supplying/receiving control section, and an operating section for operating the vehicle external communication circuit and the vehicle internal communication circuit;

the vehicle external communication circuit and the vehicle internal communication circuit are both switchable between a great power state and a decreased state in which a power consumption amount is smaller than in the great power state;

the decreased state of the communication control section is a state in which the vehicle external communication circuit and the vehicle internal communication circuit are both in the decreased state;

the great power state of the communication control section is a state in which at least the vehicle external communication circuit is in the great power state; and if the vehicle external communication circuit and the vehicle internal communication circuit are both in the decreased state and the condition for starting the interactive communication is satisfied, the operating section selectively switches the vehicle external communication circuit to the great power state to perform the interactive communication.

5. The power management device according to claim 1, wherein the supplying/receiving control section and the schedule generating section have a common hardware such that the supplying/receiving control section configures the schedule generating section;

generation of the schedule by the schedule generating section is allowed by switching the supplying/receiving control section to the great power state; and if the information obtained through the communication with the external power source device indicates that the electric power information at the side of the external power source device has been changed, the communication control section commands the supplying/receiving control section to switch to the great power state.

6. The power management device according to claim 5, wherein the communication control section is capable of communicating with both the supplying/receiving control section and a predetermined control section that is a control section other than the supplying/receiving control section and mounted in the vehicle;

the predetermined control section is switchable between a great power state and a decreased state in which a power consumption amount is smaller than in the great power state;

the supplying/receiving control section monitors in the decreased state whether a command for switch to the great power state is output from the communication control section; and if the information obtained through the communication with the external power source device indicates that the electric power information at the side of the external power source device has been changed, the communication control section selectively commands, through the communication, the supplying/receiving control section to switch to the great power state.

7. The power management device according to claim 5, wherein the communication control section is capable of communicating with both the supplying/receiving control section and a predetermined control section that is a control section other than the supplying/receiving control section and mounted in the vehicle;

the predetermined control section is switchable between a great power state and a decreased state in which a power consumption amount is smaller than in the great power state, the predetermined control section being allowed to transmit information to the communication control section by being switched to the great power state; and if the information obtained through the communication with the external power source device indicates that the electric power information at the side of the external power source device has been changed, the communication control section commands, through the communication, the supplying/receiving control section and the predetermined control section to switch to the great power state, obtains the information possessed by the predetermined control section through activation of the predetermined control section, and informs a user of the obtained information through an informing section.

* * * * *